June 13, 1950          D. V. SHERBAN          2,511,017
FUEL HANDLING AND FIRING SYSTEM
Filed March 15, 1944          4 Sheets-Sheet 1

INVENTOR.
Daniel V. Sherban

BY
ATTORNEY

INVENTOR.
Daniel V. Sherban
BY
ATTORNEY

June 13, 1950 D. V. SHERBAN 2,511,017
FUEL HANDLING AND FIRING SYSTEM
Filed March 15, 1944 4 Sheets-Sheet 3
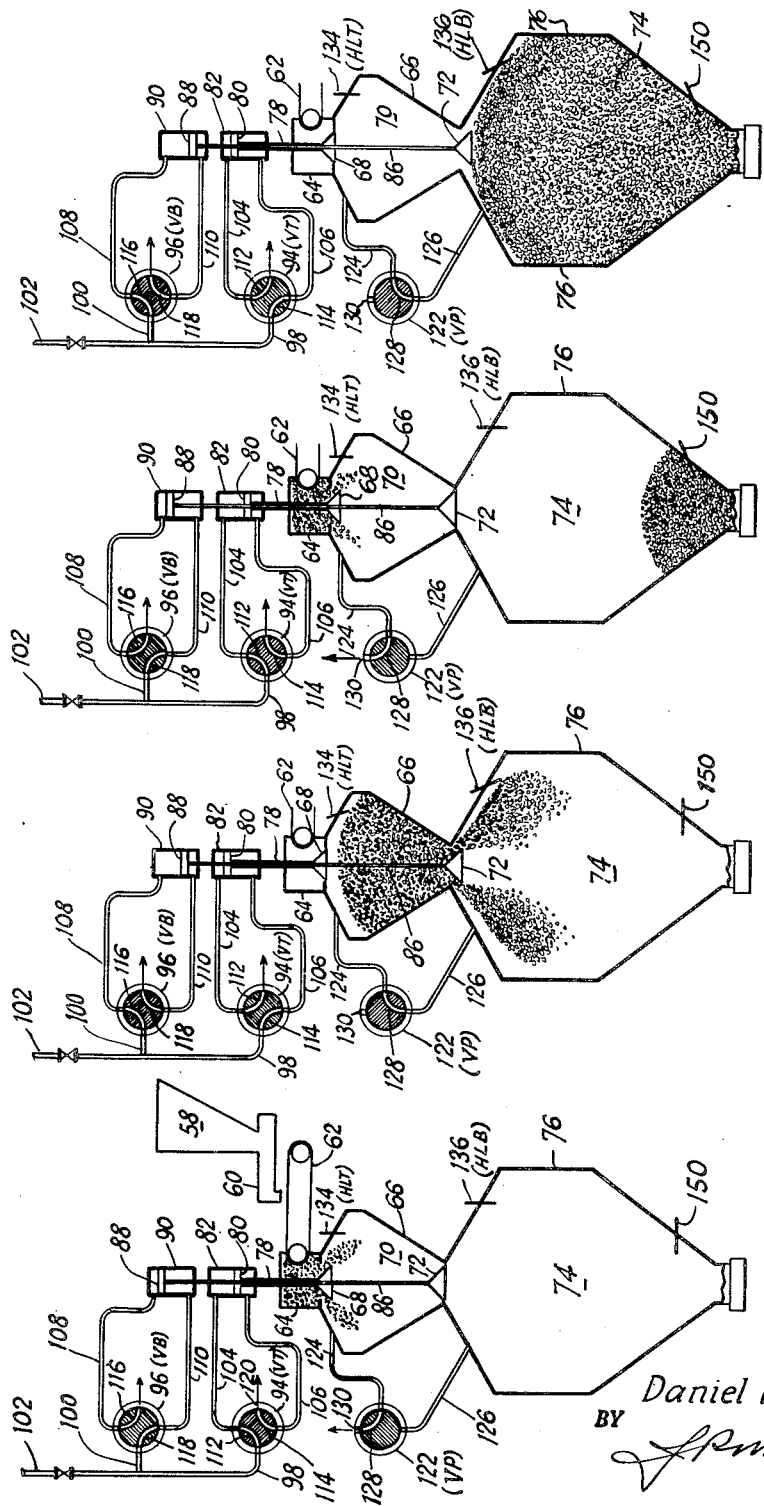
INVENTOR.
Daniel V. Sherban
BY
ATTORNEY Patented June 13, 1950

2,511,017

UNITED STATES PATENT OFFICE 2,511,017

FUEL HANDLING AND FIRING SYSTEM

Daniel V. Sherban, Keyport, N. J., assignor to The Babcock & Wilcox Company, Rockleigh, N. J., a corporation of New Jersey Application March 15, 1944, Serial No. 526,612

24 Claims. (Cl. 266—28)

The invention herein disclosed relates to a fuel handling and firing system particularly applicable to the treatment of blast furnace slag according to known fuming processes.

One such process involves the recovery of zinc and lead from blast furnace slag in the form of zinc oxide and lead oxide, the slag from a lead smelter for example being charged directly into a fuming furnace in a molted state, and pulverized coal and combustion air introduced into the bath at a level of approximately three feet or more below its upper surface. The slag is treated in batches and for each batch there is an initial heating period during which 100 percent of combustion air is injected with pulverized coal into the slag bath until the temperature is elevated to the metallic zinc vaporizing temperature. At this point, the total air for combustion is reduced below 100 per cent, thus producing a highly reducing atmosphere within the furnace reaction zone to effect the reduction of the zinc oxide contained in the slag bath. The metallic zinc is released as a vapor that rises rapidly to emerge from the slag and becomes reoxidized above the slag bath where a further supply of air is introduced. The net thermal effect of the reaction thus involved is equivalent to complete oxidation of the carbon in the fuel. Lead oxide in the slag is volatilized at the temperature of the slag and leaves the bath also as an oxide.

At the end of the complete operating cycle, which is determined by the diminishing rate of metal elimination from the bath, the treated slag is tapped off and the furnace again charged with a fresh supply of slag for repetition of the recovery operation.

The introduction of the coal-air mixture below the slag level necessarily requires operation of the fuel firing system under considerable pressure, which for the maximum operating slag level may amount to 10 pounds per square inch or thereabout. The pressure in the system may be suitably adjusted however to compensate for any changes in slag head that might occur, as during the charging and tapping periods which total about twenty-five percent of the complete operating cycle.

In a direct-fired system, that is, with the pulverized coal and primary air being supplied to the burners direct from the pulverizer, without intervening bins or storage receptacles for the pulverized coal, it follows that the pulverizer and its associated raw coal feeding apparatus must be maintained under pressures higher than those required at the burner outlets.

The adaptation of direct-firing to the fuming process has accordingly presented problems for which the present invention provides a desirable solution.

An object of the invention therefore pertains to a direct fired pulverized coal system wherein the pulverizer and its accompanying feeder apparatus may be maintained at internal operating pressures in excess of those heretofore employed.

An additional object resides in maintaining the pulverizer and feeder under unusually high operating pressure conditions while providing for regular admission of raw coal to the feeder to maintain the desired rate of pulverizer output.

A further object is directed to a suitable charging system for the pulverizer feeder whereby raw coal may be supplied continuously to the pulverizer feeder without loss of operating pressure from within the pulverizing apparatus.

Other objects provide for a charging apparatus formed in two portions, whereby raw coal delivered to one portion intermittently from an outside source is transferred to a second portion for continuous delivery to the pulverizing apparatus.

More specific objects include the coordination of coal flow into the charging apparatus with coal flow through and from the charging apparatus; the appropriate sequence and cycle of valving operations to establish and maintain pressures in various parts of the system at their predetermined operating values; together with distributor means particularly adapted for direct-firing service in a metal recovery process requiring distribution of fuel and air to a plurality of burners for injection throughout a molten mass of metal containing material.

The foregoing and other objects and features of the invention will be more fully recognized from the ensuing description predicated on a selected embodiment of the invention as illustrated in the accompanying drawings, wherein.

Figure 2:
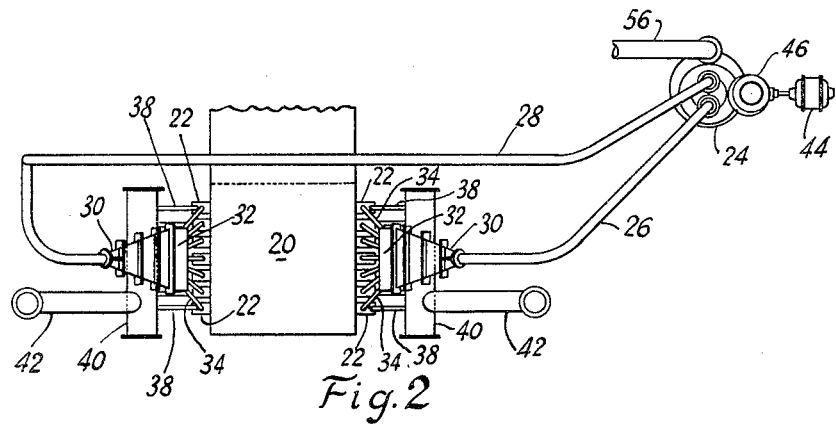
Fig. 2 is a plan view of a portion of the system illustrated in Fig. 1, the coal handling apparatus preceding the pulverizer feeder being omitted.
Figure 10:
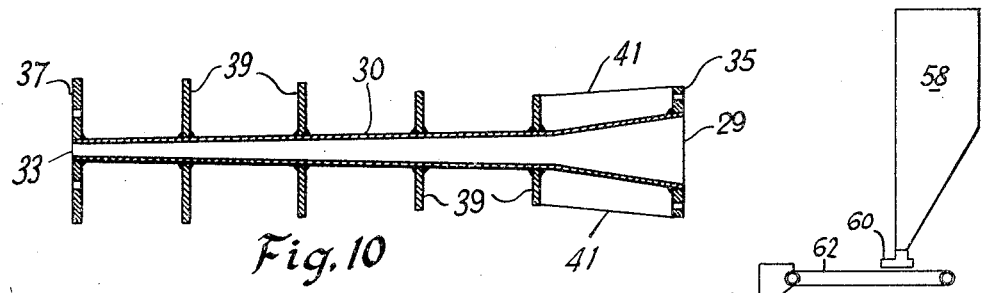
Figure 1:
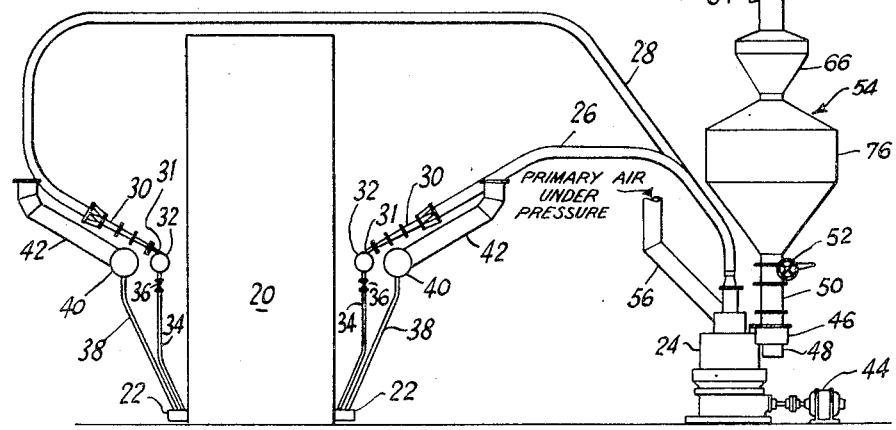
Fig. 1 is an elevational outline of apparatus arranged in accordance with my invention for continuous firing of pulverized coal under high pressure conditions.
Figure 9:
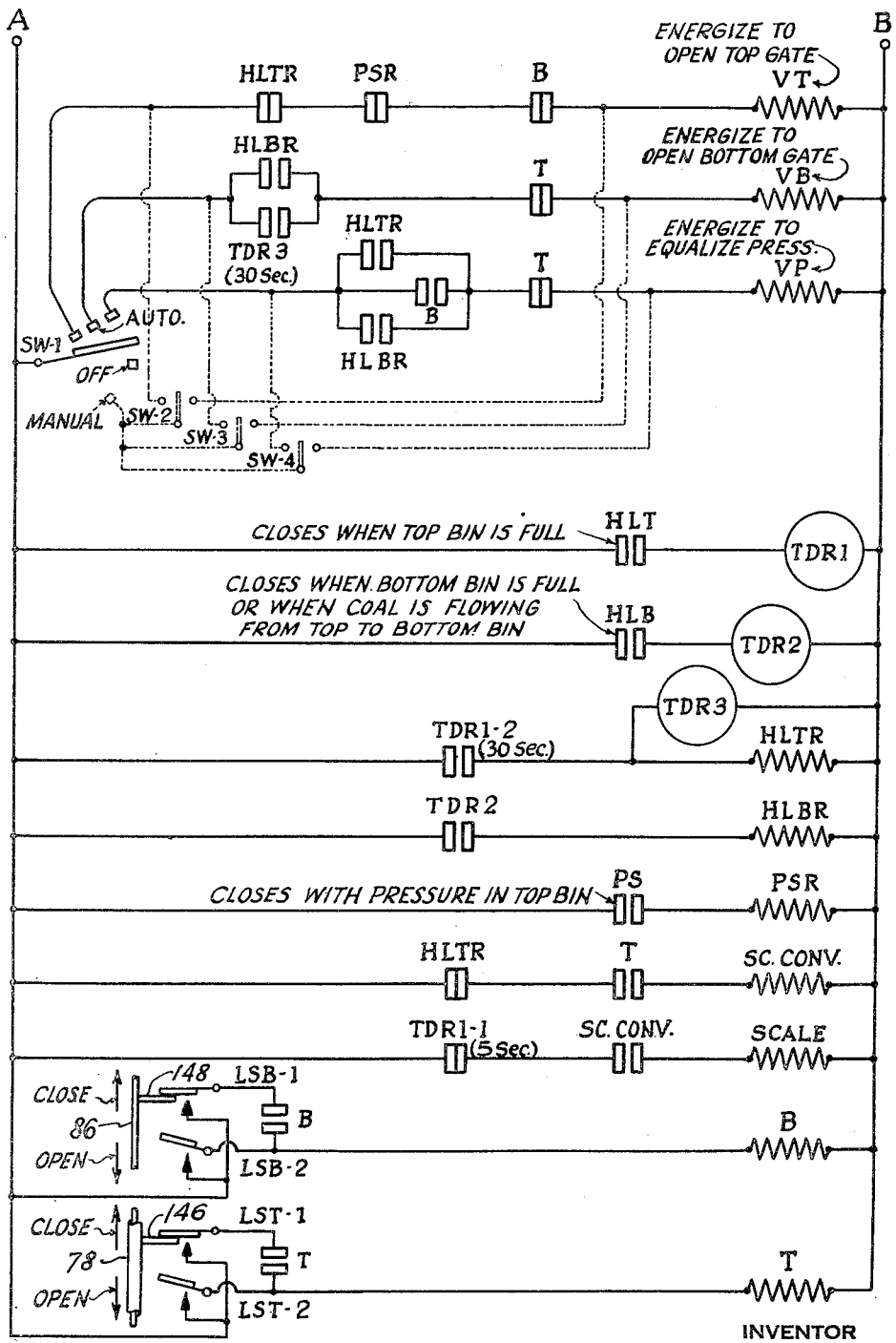

Fig. 5 to Fig. 8 inclusive are diagrammatic sectional views illustrating the cycle of operations involved in the handling of raw coal prior to entering the pulverizer feeder;

Fig. 9 is a diagram of the electrical circuits involved in the automatic control of the system disclosed; and Fig. 10 is a longitudinal section of a specific conduit element included in Figs. 1 and 2.

Figs. 1 and 2 illustrate an embodiment of my invention in a system for recovering metals from blast furnace slag in accordance with known principles of slag fuming practice. In the arrangement shown, the slag to be treated is charged into a fuming furnace 20 which is provided with a series of tuyère burners 22 distributed along two of its opposite sides; each burner projecting a mixture of pulverized coal and air into the bed of slag at the bottom of the furnace whereby the slag is rendered molten and maintained molten by the heat of combustion of the fuel, while a suitable reducing atmosphere is maintained throughout the molten bath to effect the desired reaction.

The mixture of fuel and air projected into the furnace 20 through burners 22 includes a mixture of pulverized coal and primary air discharged under pressure from an air swept pulverizer 24 and transported direct to each group of burners through the burner lines 26 and 28 respectively; each burner line 26 or 28 being connected to a distributing header 32 through a transition piece 30 and nozzle 31 by which the mixture is discharged tangentially and uniformly along the entire length of the header. Burner pipes 34 extend downwardly from the bottom of each header at longitudinal spacings to provide connections to individual burners 22; each burner pipe 34 being suitably povided with a shut off valve 36. Additional or secondary air for burners 22 is supplied under pressure through secondary air pipes 38 leading from a manifold 40 having a conduit connection 42 with a suitable course, not shown.

Each transition piece 30, as detailed in Fig. 10, is formed as a conduit element having an inlet 29 of circular cross section corresponding to the circular cross section of burner line 26 or 28, and having an outlet 33 in the form of a narrow rectangular opening corresponding to the rectangular cross section at the entrance of nozzle 31. Flanges 35 and 37 may be provided at opposite ends of each transition piece for connection do the burner lines 26 and 28, and to nozzles 31; each nozzle forming an integral part of each header 32, if desired. Intermediate flanges 39 and ribs 41 constitute reinforcing members. The internal cross sectional area of an element 30 is practically the same at both ends, although the element is of gradually flaring formation in a horizontal direction so that its outlet extends from one end of the header 32 to the others; the internal diameter of a distributing header 32 being approximately twice the diameter of the inlet opening 29. The nozzle 31, of the same internal cross section as the outlet 33 of element 30, is arranged tangentially of the header 32 to cause the entering fuel and air to sweep the inner wall of the header along its entire length, thereby providing uniform distribution of the entering mixture throughout the length of the header for similar uniform distribution to the various longitudinally spaced offtake pipes 34 leading to the burners. The length of the transition piece from inlet 29 to outlet 33 is sufficient to provide a relatively small angle of divergence to approximate the recovery portion of a Venturi throat passage to minimize pressure drop at relatively high flow velocities. Tests on apparatus proportioned substantially as above described and constructed for commercial service have shown that with an entrance velocity through inlet 29 of 4000 feet per minute, the pressure drop through the entire distributor from inlet 29 to the entrances to burner pipes 34 is only two-and-one-half inches water, including entrance loss.

The pulverizer 24 is suitably of known construction having for example a circular series of rollable grinding elements disposed about a central vertical axis and driven from an electric motor 44. Raw coal of suitable size is fed to the pulverizer by means of a feeder of any suitable type; the feeder shown being of a known type of mechanical feeder 46 having a two-speed electric motor drive 48, independent of the pulverizer drive 44, for controlling the input of coal to the pulverizer in accordance with the desired output requirements. The feeder 46 is supplied continuously with raw coal from a multichamber charging system 54 through a feed spout 50 fitted with a shut-off valve 52.

Primary air at the required pressure is supplied to the pulverizer through the primary air pipe 56, the air constituting a gaseous carrier medium for conveying finely divided coal particles through and from the pulverizer to provide a fluent output mixture of pulverized coal and air for delivery through the burner lines 26 and 28. In the system described, the pulverizer 24 is operated at relatively high internal pressures since an appreciable resistance must be overcome at the outlets of burners 22, due to the bed of slag in the furnace 20; a normal operating value being about ten pounds per square inch maximum, although operation may be successfully carried out at considerably higher pressures depending on the amount of back pressure to be encountered. The primary air is preferably preheated to an extent enabling the temperature of the output mixture to be maintained constant at approximately 150° F.

Figure 3:
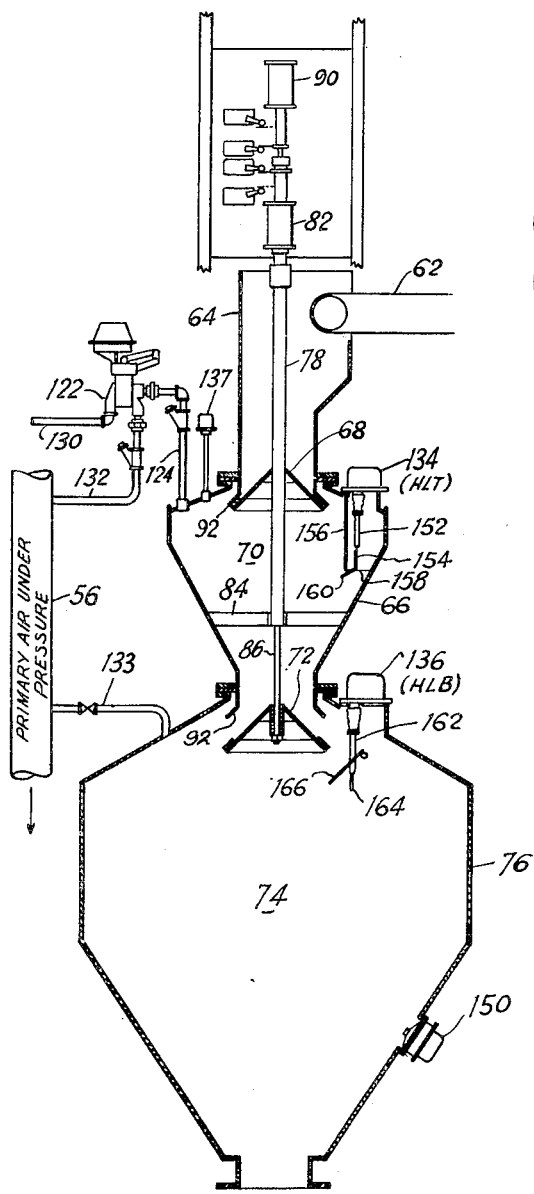
Fig. 3 is a sectional elevation of the raw coal charging apparatus of Fig. 1 together with associated valve control elements.

Raw coal is supplied to the pulverizer charging system 54 from an elevated storage hopper 58, the coal being weighed by a scale device 60 known as a weightometer from which the coal passes to a belt conveyor 62 and into the feed spout or hopper 64 for discharge into the top end of an upper charging bin, or feeder bin 66. The conveyor 62 may be operated continuously or intermittently; in the latter instance its operation being interlocked with the operation of the scale 60, as in the present system. As shown in Fig. 3, a bell valve or gate 68 is positioned at the lower end of the feed hopper 64 for controlling the movement of coal from the feed hopper to the chamber 70 provided within the upper charging bin 66, a bell valve or gate 72 being positioned at the lower end of the upper charging bin 66 for controlling the movement of coal from the charging chamber 70 to the chamber 74 provided within the lower charging bin, or supply vessel 76.

The top gate 68 is secured to a hollow rod or tube 78 actuated by the piston 80 of the air cylinder 82, the rod 78 extending through both ends of the cylinder and being movable longitudinally in a lower guide bearing 84; the bottom gate 72 being secured to a rod 86 telescoping within the hollow rod 78 and actuated by the piston 88 of the air cylinder 90. Each gate when in its closed position is resiliently seated against a flanged rubber ring 92 to afford an effective seal for the respective charging chambers 70 and 74 against an internal working pressure of about 10 p. s. i. at various stages of the bin charging cycle.

The opening and closing movements of gates 68 and 72 are controlled by the four-way electrically operated valves 94 and 96 respectively having connections 98 and 100 with a supply line 102 carrying air or other suitable fluid under pressure; such valves being shown diagrammatically in Figs. 5 to 8 inclusive; a fluid pressure of approximately 40 p. s. i. being generally suitable for the purpose.

Valve 94 for controlling the operation of the upper gate 68 is connected to the cylinder 82 by lines 104 and 106 at opposite sides of the piston 80; valve 96 for controlling the operation of the lower gate 72 being connected to the cylinder 90 by lines 108 and 110 at opposite sides of the piston 88. Valve 94 is formed with internal passages 112 and 114, and valve 96 with similar internal passages 116 and 118, for admitting fluid under pressure to the cylinders at either side of their respective pistons 80 and 88, and for simultaneously exhausting fluid from the cylinders at the opposite sides of the respective pistons.

For example, in order to cause the upper gate 68 to be moved downwardly to its open position, as indicated in Fig. 5, the passage 112 of valve 94 is brought into register with the supply line connection 98 and cylinder connection 104, while the passage 114 is brought into register with the cylinder connection 106 and the exhaust port 120, thereby establishing a higher pressure above than below the piston 80 and causing the upper gate 68 to be opened. In order to return the upper gate 68 to its closed position, as indicated in Fig. 6, the valve 94 is operated to transpose the positions and corresponding connections of the internal passages 112 and 114, thereby establishing a higher pressure below the piston 80 than above; the passage 114 connecting the supply line connection 98 with the cylinder connection 106, and the passage 112 connecting the cylinder connection 104 with the exhaust port 120. The lower gate 72 is opened and closed in a similar manner, as is evident from the drawings; valve 96 being operated to position the passage 116 and 118 as shown in Fig. 6 to cause the gate 72 to be opened, and as shown in Fig. 5 to cause the gate 72 to be closed.

An electrically operated three-way valve 122 is provided to regulate fluid pressure conditions within the upper and lower bin chambers 70 and 74; the valve 122 having connections 124 and 126 with the bins 66 and 76 respectively, and having an internal passage 128 for connecting the upper bin connection 124 either with the lower bin connection 126 for equalizing pressures between the bin chambers 70 and 74, or with the exhaust port 130 for venting the upper bin chamber 70. If desired, the pressures in bin chambers 70 and 74 may be equalized by providing connections for the three-way valve 122 as shown in Fig. 3, whereby both chambers may be connected to a common fluid pressure source such as the primary air duct 56 leading to the pulverizer; the connection 126 from the valve 122 direct to the lower bin 76 being replaced by the two air duct connections 132 and 133 leading from the valve 122 and the bin 76 respectively.

When equalization is effected by the connections shown in Figs. 5–8, the resulting pressure above the bed of coal is due only to filtration and therefore lower than the pressure within the pulverizer, which if the differential were high enough might interfere with the feed of coal to the pulverizer. However, when the bin pressures are equalized by providing connections to the air duct 56 as in Fig. 3, the resulting pressure above the bed of coal is slightly higher than that in the pulverizer and tends to improve the feeding operation.

A pressure switch 137 is fitted to the upper bin 66 at a point above the maximum coal level where it is exposed to fluid pressure within the bin. Thus when valve 122 is moved to its equalizing position, the pressure in the upper bin 66 is increased until it reaches the predetermined equalizing value whereupon the associated switch contacts PS (Fig. 9) are closed and the system is conditioned for opening the bottom gate 72 between the upper and lower bins 66 and 76. For another condition of the system, with the top and bottom gates closed, and when it is desired to open the top gate 68 for charging the upper bin 66, the three-way valve 122 is moved to its venting position (Fig. 5) whereupon the pressure in the upper bin 66 is reduced to atmospheric pressure causing the switch contacts PS to be opened.

The operation of the various valves (94, 96, 122), gates (68, 72), and coal weighing and feeding devices (60, 62), is controlled by high level indicators 135 and 136 mounted on the top and bottom bins respectively, together with limit switches 138 and 140 actuated by a bar 146 movable with the top-gate rod 78, and limit switches 142 and 144 actuated by a bar 148 movable with the bottom-gate rod 86. The bottom bin 76 may be equipped with a low level indicator 150, if desired, merely to actuate an alarm or signal, without entering into the control of the system.

The high level indicators 134 and 136 are suitably of the type disclosed in U. S. Patent 1,936,844, A. G. Kinyon, patented November 28, 1933, wherein an electrical circuit is either opened or closed in response to the swing or deflection of a pendulous member from its normal position of rest, each indicator incorporating an associated switch suitably of the Mercoid type. As shown in Fig. 3, the high level indicator 134 for the top bin 66 includes a pivoted paddle member or lever 152 formed with a paddle 154 at its lower end, the indicator being mounted at such a location as to cause the member 152 to be deflected to an extent sufficient to close the contacts of an associated switch HLT when the bed of coal in the upper bin 66 reaches a predetermined maximum level. At lower levels and when the bid is empty, the lever resumes its normal pendulant position to open the contacts of the switch. The paddle member 152 is partially enclosed by a front plate 156 and side plates 158 forming a compartment open at its bottom to prevent the incoming coal from building up behind the paddle 154 and preventing its deflection; the paddle 154 having its lower portion extended at an angle to the vertical, as at 160, to assure more positive deflecting action.

The high level indicator 136 for the bottom bin 76 includes a pivoted paddle member or lever 162 having a paddle 164 at its lower end and an additional paddle 166 at an intermediate location; the paddle 166 being inclined to the lower paddle 164 and therefore inclined to the vertical and in the path of the incoming coal from the upper bin 66. The paddle member 162 is thus caused to be deflected not only by the level of coal in the lower bin 76, at some predetermined maximum level, but also by the flow of coal into the lower bin 76 from the upper bin 66. The deflection of the paddle member 102 under either of these two conditions causes the contacts of the associated switch HLB to be closed; the return of the paddle member 102 to its normal pendant position causing the contacts of the switch HLB to be opened.

Figure 4:
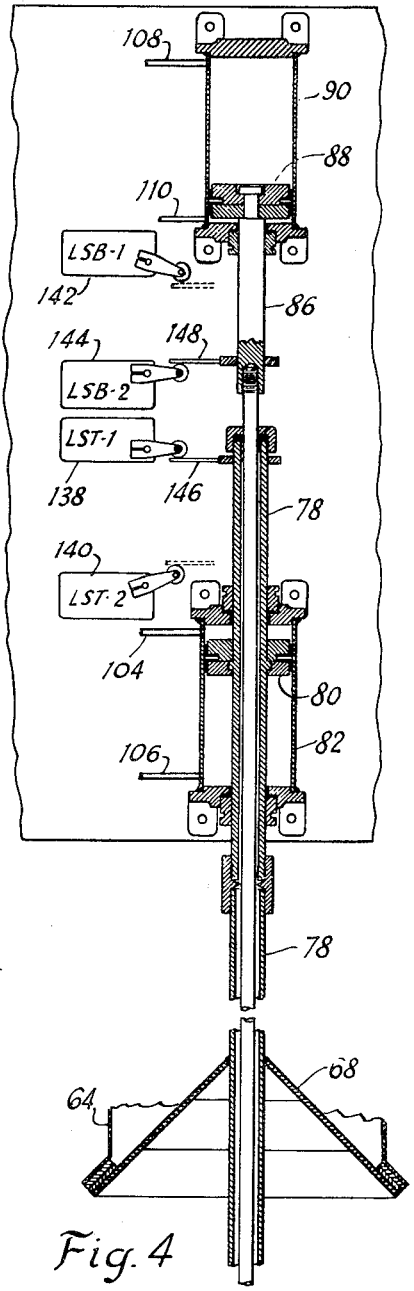
Fig. 4 is an enlarged fragment of Fig. 3.

The limit switches 138, 140, 142 and 144 are mounted as shown in Figs. 3 and 4 adjacent the line of travel of the top and bottom gate rods 78 and 86 so as to be actuated by the respective bars 146 and 148 which project therefrom. When the top gate 68 is moved upwardly to its closed position, the bar 146 attached to the outer gate rod 78 is moved to its corresponding uppermost position whereupon it engages the arm of the snap-action switch 138 to cause the associated switch contacts LST—1 to be opened; when the top gate 68 is moved downwardly to its open position, the bar 146 being moved to its corresponding lowermost position whereupon it engages the arm of the snap-action switch 140 to cause the associated switch contacts LST—2 to be closed. Similarly, when the bottom gate 72 is moved upwardly to its closed position, the bar 148 attached to the inner gate rod 86 is moved to its corresponding uppermost position whereupon it engages the arm of the snap-action switch 142 to cause the associated switch contacts LSB—1 to be opened; when the bottom gate 72 is moved downwardly to its open position, the bar 148 being moved to its corresponding lowermost position whereupon it engages the arm of the snap-action switch 144 to cause the associated switch contacts LSB—2 to be closed.

The cycle of operations involved in the continuous delivery of raw coal to the pulverizer feeder 46 will be understood by reference to Figs. 5 to 9 inclusive; Figs. 5 to 8 being diagrammatic views of the apparatus illustrating the various positions of the control valves and bin gates at different stages, and Fig. 9 showing a schematic arrangement of the various electrical circuits for maintaining automatic operation of the various components throughout the cycle. In the electrical diagram (Fig. 9) the letters A and B designate the power terminals across which a suitable operating voltage such as 110 volts, alternating current, may be applied. A selector switch SW—1 is included to provide for either "automatic" or "manual" operation; the switch being shown in an "off" position so that all circuits and windings involved are "deenergized" and all switch contacts "normally open" or "normally closed" as indicated. It is assumed however that the pressure from line 102 is "on" causing both gates 68 and 72 to be held closed.

The symbols VT, VB and VP designate the actuating coils or solenoids for controlling the operation of valves 94, 96 and 122, respectively; the coil VT, when energized, causing the four-way valve 94 to be positioned as in Fig. 5 to cause the top gate 68 to be opened; the coil VB, when energized, causing the four-way valve 96 to be positioned as in Fig. 6 to cause the bottom gate 72 to be opened; and the coil VP, when energized, causing the three-way valve 122 to be positioned as in Fig. 6 to equalize pressures in the upper and lower bins 66 and 76.

Coils HLTR and HLBR are relay coils, for the high level indicators 134 and 136 respectively, which are energized or deenergized in accordance with the "make" or "break" of the switch contacts HLT and HLB.

Coil PSR is a relay coil which is energized or deenergized in response to the operation of contacts PS of the pressure switch 137.

Coils marked "Scale" and "Sc. conv." are starter relay coils for motors driving the scale 60 and scale conveyor 62 respectively.

Coils T and B are relay coils which are energized or deenergized in response to the operation of the limit switches 138, 140, 142 and 144 whose contacts LST—1, LST—2, LSB—1 and LSB—2 are opened or closed in accordance with the opening or closing of the top and bottom gates 68 and 72.

Each set of contacts which is opened or closed as the result of any given relay being energized or deenergized, is designated by the same symbol as that assigned to the relay; for example, relay T at the bottom of the diagram has associated with it the contacts marked "T" so that when relay T is energized, all normally-closed contacts T are opened, and all normally-open contacts T are closed; and vice versa, when relay T is deenergized. In the case of the time delay relays TDR1, TDR2 and TDR3, the associated contacts are identified to indicate the sequence of operation, if any, as in the case of relay TDR1 whose contacts TDR1—1 and TDR1—2 are operated in the order named.

Double-throw switches SW—2, SW—3 and SW—4 may be provided, together with the connections shown, for manual control of individual circuits in whole or in part; the switches being suitably arranged and interlocked, in known manner, so that only the correct sequence is possible.

The cycle of operations may be considered to start and end with the charging of the upper bin 66 as indicated in Fig. 5. It will be assumed however that before the initiation of the cycle the system is in a state of rest, with the selector switch SW—1 "off" as indicated in Fig. 9, and with no coal in the system, although continuously available in the storage bin 58. It will be further assumed that the air pressure has been turned on from line 102 so that both gates 68 and 72, top and bottom, are in their closed positions; with valve 122 in the "venting" position to place the upper bin 66 under atmospheric pressure.

The selector switch SW—1 may then be set for "automatic" operation thereby completing the circuit through the solenoid VT and causing the top gate 68 to be opened, the contacts HLTR, PSR and B in this circuit being normally closed as indicated. The opening of gate 68 results in the closing of limit switch contacts LST—1 and LST—2 to complete the circuit through relay coil T causing the scale conveyor relay Sc. conv. to be energized and the scale conveyor 62 to be operated. The energization of the conveyor relay causes contacts Sc. conv. to be closed, thereby energizing the relay marked "Scale" and placing the scale or weightometer 60 in operation. Coal from storage bin 58 is thus weighed and delivered to the feed spout or hopper 64 from which it passes into the upper charging bin 66 as illustrated in Fig. 5.

When the coal in the upper bin 66 builds up to its predetermined maximum level, the paddle of the high level indicator 134 is deflected causing contacts HLT to be closed and time delay relay TDR1 to be energized whereupon after a predetermined interval of five seconds, for example, the contacts TDR1—1 are opened, thereby stopping the scale 60 while the scale conveyor 62 remains in operation to empty it of coal. About twenty-five seconds later, the contacts TDR1—2 are closed causing the relay HLTR to be energized and in addition the time delay relay TDR3. The energization of relay HLTR causes all contacts HLTR to be actuated, the result being to deenergize the starter relay Sc. conv. to stop the scale conveyor 62, and to deenergize the solenoid VT to close the top gate 68. The closing of the top gate 68 opens the limit switch contacts LST—1 and LST—2, deenergizing the relay T and restoring all contacts T to normal, and causing solenoid VP to be energized to equalize pressures between the upper and lower bins 66 and 76. When the pressures become equalized, the pressure switch contacts PS close and relay PSR becomes energized to open contacts PSR, thereby holding the solenoid VT deenergized and the top gate closed. By the time bin pressures are equalized, after a time delay period of about thirty seconds, the relay TDR3 acts to close contacts TDR3 thereby energizing the solenoid VB and opening the bottom gate 72; the limit switch contacts LSB—1 and LSB—2 closing; bottom gate relay B becoming energized; and all contacts B being changed from their normal positions. The system is now in the condition illustrated in Fig. 6 with coal flowing from the upper bin to charge the lower bin 76.

After a certain amount of coal has run out of the upper bin 66, the paddle of the high level indicator 134 swings back to its normal pendulant position causing the switch HLT to be opened and the relay TDR1 to be deenergized. Contacts TDR1—2 then open to deenergize relays HLTR and TDR3 which, if it were not for some corrective factor, would result in relay VB being deenergized to close the bottom gate 72. However, the coal flowing into the lower bin 76 causes the paddle of the high level indicator 136 to be deflected so that switch HLB closes and relay TDR3 becomes energized; contacts TDR2 then closing to energize relay HLBR; and all contacts HLBR being closed from their normally-open positions to maintain the circuit through relay VB closed, thereby holding the bottom gate 72 open with the valve 122 still in the pressure equalizing position.

When the upper bin 66 becomes empty so that flow into the lower bin ceases, and provided the lower bin 76 is not full, the high level indicator 136 returns to normal and switch HLB opens, deenergizing relay TDR2 and thereby relay HLBR; the contacts HLBR thus being restored to their normally-open positions whereupon relay VB is deenergized and the bottom gate 72 is closed. The closing of the bottom gate causes relay B to become deenergized and all contacts B to be restored to normal, thus deenergizing relay VP for reducing the pressure in the upper bin 66. As sooon as the pressure in the upper bin reaches atmospheric pressure or thereabout, the pressure switch contacts PS open so that relay PSR is deenergized and contacts PSR are restored to their normally closed position, thereby energizing the relay VT and causing the top gate 68 to open; relay T being energized, all contacts T changed; the scale conveyor 62 placed in operation and then the scale 60; thus completing the cycle and bringing the system to the condition shown in Fig. 7, with coal entering the upper bin 66 as in Fig. 5 at the start of the cycle.

If during any cycle the coal from bin 66 should fill the lower bin 76, at least to the level where the paddle of indicator 136 would be deflected and remain deflected as in Fig. 8, due to a low rate of withdrawal through the pulverizer feeder 46, for example, the system will come to rest with the bottom gate 72 open, the top gate 68 closed, the bin pressures equalized, and with the scale 60 and scale conveyor idle. The condition of the system is then equivalent to that described in connection with Fig. 6 except that the indicator 136 and its switch HLB are actuated by the high coal level in the lower bin 76 instead of by the flow of coal into the bin. A subsequent reduction in coal level below the operating range of the indicator 136 will return the indicator to its normal position with its switch HLB open for resumption of the charging operation as in Fig. 7.

In a system such as described, a continuous supply of the coal or other material to be pulverized is maintained in the lower bin 76 so that the pulverizer may be operated without interruption irrespective of the rate at which the material is fed from the bin into the pulverizer by means of the feeder 46. With the upper and lower bins of different volumetric capacities as shown, the lower bin is large enough to hold more than a single complete charge from the upper bin 66 and thereby provide a reserve of material in the lower bin in case of a temporary interruption in the delivery of material to the lower bin such as might result from an interruption in the supply of raw material to the storage hopper 58; the upper bin 66 being of large enough capacity so that when its normal charge is emptied into the lower bin, the amount of material thus made available to the feeder 46 is sufficient to last through at least one complete bin cycle with the feeder operating at maximum capacity.

Notwithstanding the intermittent charging of the upper bin at atmospheric pressure, there is no loss of pressure from within the pulverizer since the lower bin, the feeder, and the pulverizer are continuously sealed against atmospheric pressure, and the bin maintained under fluid pressure substantially the same or higher than the internal pulverizer pressure. It will be noted also that the sealing is effected by means of apparatus of such form and construction as to provide free movement of the material therethrough and to obviate the need for an unduly high head of material which with the long system of piping required would have a tendency to clog or bridge in the system and lead to an interruption or irregularity in the delivery of material.

I claim:

1. A fuel handling and firing system adapted to receive coal to be pulverized at atmospheric pressure and to discharge pulverized coal and air against a burner outlet pressure above atmospheric pressure, of about ten pounds per square inch, for example, said system comprising a pulverizer, a mechanical feeder opening into said pulverizer, means for forcing air through said pulverizer at a pressure sufficient to overcome said outlet pressure, and apparatus for continuously supplying coal to said feeder, said apparatus comprising an upper and a lower charging bin having a connection therebetween for gravity flow of coal from one bin to the other, said upper bin having a top coal inlet, said lower bin having a bottom coal outlet to said feeder, a charging gate movable to open and close the connection between said bins, a second charging gate movable to open and close said top coal inlet, and means responsive to the flow of coal through said apparatus for operating said charging gates in predetermined sequence to successively charge said bins while maintaining predetermined pressure conditions in said pulverizer.

2. A fuel handling and firing system adapted to receive coal to be pulverized at atmospheric pressure and to discharge pulverized coal and air against a pressure equivalent to a head of molten slag or the like, said system comprising a pulverizer, a mechanical feeder opening into said pulverizer, means for forcing air through said pulverizer at a pressure sufficient to overcome the pressure comparable to said head of slag, and apparatus for continuously supplying coal to said feeder while maintaining predetermined pressure conditions within said pulverizer, said apparatus comprising an upper and a lower charging bin having a connection therebetween for gravity flow of coal from one bin to the other, said lower bin having a bottom outlet to said feeder, means for closing said connection when charging said upper bin, means for equalizing pressures between said bins after said upper bin has been charged, and means responsive to the operation of said pressure equalizing means for opening said connection between said bins.

3. A charging system for a pulverizer under a positive pressure comprising a mechanical feeder opening into the pulverizer, a closed bin arranged to discharge into said feeder, a charging hopper having a material inlet at its upper end and its lower end opening into said bin, a charging gate movable to open and close the connection between said hopper and bin, a second charging gate movable to open and close said material inlet, a three-way pressure equalizing valve connected to said hopper and bin and to the atmosphere, a material level indicator in said bin, a second material level indicator in said hopper, and means for operating said charging gates and pressure equalizing valve in a predetermined sequence in response to the operation of said level indicators to successively charge said hopper and bin while maintaining predetermined pressure conditions in said bin and feeder.

4. A charging system for a pulverizer under a positive pressure comprising a mechanical feeder opening into the pulverizer, a closed bin arranged to discharge into said feeder, a charging hopper having a material inlet at its upper end and its lower end opening into said bin, a charging gate movable to open and close the connection between said hopper and bin, a second charging gate movable to open and close said material inlet, a three-way pressure equalizing valve connected to said hopper and bin and to the atmosphere, a material level indicator in said bin, a second material level indicator in said hopper, and means for operating said charging gates and pressure equalizing valve in a predetermined sequence in response to the operation of said level indicators to successively charge said hopper and bin while maintaining predetermined pressure conditions in said bin and feeder, said material level indicator in said bin being additionally responsive to the flow of material into said bin.

5. A charging system for an air swept pulverizer arranged to discharge pulverized material and air against a pressure equivalent to a head of molten slag or the like, said pulverizer having its material inlet separate from its inlet for carrier air, said system comprising a mechanical feeder opening into said pulverizer for controlling the input of material to said pulverizer through said material inlet, means connected to said air inlet for forcing carrier air through said pulverizer at a pressure sufficient to overcome the resistance afforded by said head of slag, a closed lower bin arranged for gravity discharge into said feeder, an upper bin having a material inlet at its upper end and having a bottom connection with said lower bin, a charging gate movable to open and close the connection between said bins, a second charging gate movable to open and close said material inlet, a pressure equalizing valve connected to said upper bin and to the atmosphere, said valve and lower bin having equalizing connections with a common source of fluid pressure substantially equal to the pressure of air supplied to said pulverizer, said valve in one position completing a connection between said upper bin and the atmosphere and in another position completing a connection between said upper bin and said common source of fluid pressure, and means for operating said charging gates and pressure equalizing valve in predetermined sequence to successively charge said bins while maintaining predetermined pressure conditions in said pulverizer.

6. In a pulverizer system including a pulverizer arranged for wide range operation under positive fluid pressure, apparatus for supplying material to be pulverized to said pulverizer without loss of said pulverizer pressure comprising an inlet and an outlet chamber connected in series, means for intermittently charging said inlet chamber at atmospheric pressure, means for intermittently charging said outlet chamber from said inlet chamber at a pressure higher than atmospheric pressure, means for feeding material from said outlet chamber into said pulverizer at said higher pressure apparatus in each of said chambers operable in response to the level of material therein, and means including said level responsive apparatus for restricting the operation of said charging means to a predetermined sequence and at varying rates.

7. In a system for delivering material to a pulverizer arranged to be swept internally by a gaseous carrier medium under positive pressure, a charging apparatus formed with upper and lower compartments having a connecting passageway therebetween for gravity flow of material from one compartment to the other, said upper compartment having a top material inlet, a top gate for opening and closing said inlet, a bottom gate for opening and closing said passageway, means for conveying material to said inlet from a source outside said system, means for separately operating said conveying means and said gates, means responsive to the opening of said top gate for initiating the operation of said conveying means and thereby the delivery of material into said upper compartment, means responsive to the delivery of material into said upper compartment for opening said bottom gate to allow material to pass into said lower compartment, and means for feeding material from said lower compartment into said pulverizer without loss of said pulverizer pressure.

8. A charging system for a pulverizer arranged for operation under positive fluid pressure comprising a means for feeding material into said pulverizer at varying rates, an upper and a lower bin having a connection therebetween for gravity flow of material from one bin to the other, said upper bin having a material inlet at its top end, said lower bin having a material outlet at its bottom end continuously open to said feeding means, a top gate for opening and closing said material inlet and a bottom gate for opening and closing said connection, means for operating each of said gates, a conveyor for delivering material to said material inlet at atmospheric pressure, a weighing device having means for delivering material to said conveyor, means for placing said upper bin under atmospheric pressure when both of said gates are closed, means operable in response to the operation of said last named means for opening said top gate and thereafter to initiate the operation of said conveyor and then said weighing device, means for closing said top gate when the material in the upper bin reaches a predetermined level, means for equalizing the fluid pressures in said bins and thereafter opening said bottom gate while holding said top gate closed to allow material to flow into said lower bin for feeding into the pulverizer, and means for closing said bottom gate upon the cessation of material flow into said lower bin.

9. In a system for delivering material to a pulverizer arranged to be swept internally by a gaseous carrier medium under positive pressure, a charging apparatus formed with upper and lower compartments having a connecting passageway therebetween for gravity flow of material from one compartment to the other, said upper compartment having a top material inlet, said lower compartment having a bottom material outlet, means for transferring material from said outlet into said pulverizer without loss of said pulverizer pressure, a top gate for opening and closing said inlet, a bottom gate for opening and closing said passageway, a scale for weighing material passing therethrough, means including said scale for conveying weighed amounts of material to said inlet from a source outside said system, means for operating said conveying means and said gates in predetermined sequence to hold said bottom gate closed and said top gate open during the operation of said conveying means, and means responsive to a predetermined increase in level of material in said upper compartment for interrupting the operation of said conveying means and for subsequently closing said top gate while continuing to hold said bottom gate closed.

10. In a pulverizer system including a pulverizer arranged to be swept internally by a gaseous carrier medium under superatmospheric pressure, said pulverizer having an inlet for material to be pulverized separate from the inlet for said gaseous medium and having an outlet for said gaseous medium together with pulverized material entrained therein, a superposed supply receptacle under atmospheric pressure for material to be pulverized, a regulating feeder discharging into the pulverizer and thereby having its outlet subject to the pressure within said pulverizer, and means intermediate said receptacle and said feeder for transferring material from said receptacle to the intake of said feeder by gravity, said means being constructed and arranged to restrict the loss of pulverizer pressure by restricting the escape of said gaseous medium in contraflow relation to the discharge of material into said pulverizer, said means comprising an upper chamber and a lower chamber connected in series in gas tight relationship, said upper chamber being arranged to receive material from said receptacle and said lower chamber having an outlet continuously open to the intake of said feeder, and means responsive to changes in material levels within said chambers for regulating material flow into and from said upper chamber, said last named means including valving means between said receptacle and said upper chamber and between said upper and lower chambers.

11. In combination with a pulverizer arranged to be swept internally by a gaseous carrier medium under superatmospheric pressure, said pulverizer having an inlet for material to be pulverized and a separate inlet for said carrier medium, a feeder connected to said material inlet for supplying material to said pulverizer at regulable rates, apparatus for receiving material to be pulverized from a source of supply at atmospheric pressure and for delivering said material to the intake of said feeder at a pressure corresponding to the pressure within said pulverizer, said apparatus comprising an upper chamber and a lower chamber arranged for gravitational flow of material therethrough and into said feeder, means for alternately charging said upper chamber with material from said source and said lower chamber with material from said upper chamber, said lower chamber having a charging capacity greater than the charging capacity of said upper chamber, and means responsive to the movement of material through said chambers for controlling the frequency of said alternate charging operations.

12. In a direct firing pulverizer system wherein fuel is projected into a furnace in a pulverized state for combustion within a mass of material such as blast furnace slag, the method of handling said fuel for delivery into said furnace at a pressure sufficient to overcome the resistance due to said mass, which comprises, transferring said fuel in an unground state from a source at atmospheric pressure into a pulverizing zone swept by a gaseous medium under superatmospheric pressure while restricting the escape of said medium from said pulverizing zone other than the normal discharge through the pulverizing zone outlet, transporting pulverized fuel from said pulverizing zone outlet in a stream of said carrier medium, conducting said stream containing said pulverized fuel direct to said furnace, and maintaining said carrier medium at a pressure sufficient to deliver said pulverized fuel into said furnace against the resistance afforded by said mass.

13. A fuel handling and firing system adapted to receive coal to be pulverized from a source at atmospheric pressure and to discharge pulverized coal and air against a superatmospheric pressure equivalent to a head of molten slag or the like, said system comprising a pulverizer having an inlet for coal to be pulverized and a separate inlet for carrier air, a feeder connected to said coal inlet for delivering unpulverized coal into said pulverizer, means connected to said air inlet for forcing air through said pulverizer for discharge therefrom together with pulverized coal carried by said air at a pressure sufficient to overcome the pressure comparable to said head of slag, and apparatus including said feeder for continuously supplying unpulverized coal to said pulverizer without affecting pressure conditions within said pulverizer.

14. The method of supplying pulverized fuel to a combustion chamber for combustion therein under a pressure at least several pounds per square inch above atmospheric pressure which comprises, transferring the fuel in an unpulverized state from a source at atmospheric pressure through a series of zones into a final pulverizing zone in which a superatmospheric pressure above the combustion chamber pressure is maintained, intermittently maintaining the first of said zones at atmospheric pressure to receive fuel from said source and at other times maintaining a superatmospheric pressure therein substantially the same as within succeeding zones including said pulverizing zone, directing a gaseous carrier medium through said pulverizing zone for continuous transportation of pulverized fuel thereby from said zone and the maintenance of said superatmospheric pressure therein, and conducting said pulverized fuel and carrier medium direct to said combustion chamber.

15. In a direct firing pulverizer system, an air swept pulverizer having a discharge connection to a furnace zone adapted to receive pulverized fuel at superatmospheric pressures ranging upwardly to at least 10 p. s. i., said pulverizer being of a mechanical type having relatively movable grinding surface components and having an inlet for raw fuel and a separate inlet for carrier air by which pulverized fuel is transported to said furnace zone, an air supply conduit conducting carrier air to said pulverizer air inlet at positive pressures higher than the pressure in said furnace zone, a raw fuel charging chamber system for said pulverizer comprising a superposed charging bin having a bottom outlet for gravity discharge of fuel therefrom, a mechanical feeder connecting said bottom fuel outlet to said pulverizer fuel inlet for regulating the delivery of raw fuel into said pulverizer, and means for maintaining said charging bin under positive pressure comprising a valve opposite said outlet and an air pressure connection to said air supply conduit.

16. A charging system for a pulverizer internally swept by gaseous carrier fluid under positive pressure and having conduit means associated therewith for supplying said carrier fluid thereto, said charging system comprising a mechanical feeder opening into the pulverizer, a closed bin arranged to discharge into said feeder, a charging hopper having a material inlet at its upper end and its lower opening into said bin, a charging gate movable to open and close the connection between said hopper and bin, a second charging gate movable to open and close said material inlet, pressure equalizing means having fluid connections with said bin and said hopper respectively and with said conduit means supplying carrier fluid to said pulverizer, a valve in said hopper connection operable from a pressure equalizing position to a position providing a connection from said hopper to atmosphere, a material level indicator in said bin, a second material level indicator in said hopper, and means for operating said charging gates and said valve in a predetermined sequence in response to the operation of said level indicators to successively charge said hopper and bin while maintaining predetermined pressure conditions in said bin and feeder.

17. In combination with a pulverizer arranged to be swept internally by a gaseous carrier medium under superatmospheric pressure, said pulverizer having an inlet for material to be pulverized and a separate inlet for said carrier medium, a feeder connected to said material inlet for supplying material to said pulverizer at regulable rates, apparatus for receiving material to be pulverized from a source of supply at atmospheric pressure and for delivering said material to the intake of said feeder at a pressure corresponding to the pressure within said pulverizer, said apparatus comprising an upper chamber and a lower chamber arranged for gravitational flow of material therethrough and into said feeder, means for intermittently charging said upper chamber with material from said source and said lower chamber with material from said upper chamber, means in one of said chambers responsive in part to the flow of material into said one chamber and in part to the level of material within said one chamber, and means including said last named means for maintaining a predetermined sequence of said intermittent charging operations while maintaining predetermined superatmospheric pressure conditions within said pulverizer.

18. In combination, an air swept pulverizer, a closed supply vessel for raw fuel having an open feeding connection with the pulverizer, a closed feeder bin for the supply vessel having a filling opening and having a gravity flow outlet to the supply vessel, a source of operating air under pressure connected with the pulverizer for delivery of fuel therein to a furnace, an air pressure equalizing line from the source of operating air to the feeder bin, a normally open air valve in said line operable to close the line and connect the bin with atmospheric pressure, a closure valve for the filling opening of the feeder bin, a closure valve for the outlet of the feeder bin, means operable by a rise of material in the supply bin to a predetermined level to cause the closure valve in the outlet of the feeder bin to move to closed position, means operated by the closing of said valve to adjust the air valve in the pressure equalizing line to connect the bin with atmospheric pressure, means in the feeder bin operable by such change of air pressure in the bin to open the closure valve of the filling opening of the feeder bin, means operable by a rise of material in the feeder bin to a predetermined level to move the closure valve of the filling opening of the feeder bin to closed position and means operable incident to the closing of said valve for moving the closure valve of the outlet opening of the feeder bin leading to the inlet of the supply vessel to open position and to adjust the air valve of the pressure equalizing line to normal position.

19. In combination, an air swept pulverizer, a source of operating air connected with the pulverizer, a closed supply vessel for raw fuel having a gravity feed connection with the pulverizer, a closed feeder bin having a filling opening and having a gravity flow discharge passage into the supply vessel, an air pressure equalizing line from the source of operating air to the feeder bin, a valve in said line operable to selectively connect the bin with atmospheric pressure or with the pressure of operating air, a closure valve for the filling opening of the feeder bin, a closure valve for the discharge passage into the supply vessel, an air pressure switch and a high level indicator switch in the feeder bin, a high level indicator switch in the supply vessel, devices operating under control of said high level indicator switch of the supply vessel to close the valve in said discharge passage, devices operated incident to such movement of said valve to open the valve in the pressure equalizer line to effect a condition of atmospheric pressure in the feeder bin, devices energized by the said pressure switch incident to this condition of atmospheric pressure, to open the valve in the filling opening of the feeder bin for delivery of raw fuel into the feeder bin, devices controlled by actuation of the high level indicator in the feeder bin for closing the said closure valve of the feeder bin, devices operated incident to closing of said closure valve to cause the valve in the pressure equalizing line to be adjusted to admit operating air pressure to the feeder bin, devices operated by the air pressure switch when air pressure in the feeder bin equals that in the supply vessel, to cause the valve in the discharge opening of the feeder bin to be opened.

20. A combination as recited in claim 19 wherein the control devices for the valves of the said filling opening and discharge passage of the feeder bin are connected with pistons in double acting pressure cylinders, and each of said cylinders is connected at its ends with a source of pressure medium through a four-way solenoid valve; the closure valve for the discharge passage of the feeder bin being closed by an energizing circuit that is controlled through the high level indicator switch of the supply vessel and the closure valve for the filling opening of the feeder bin being closed through the said air pressure switch.

21. A combination as recited in claim 19 wherein the control devices for the valves of the feed filling opening and discharge passage of the feeder bin are connected with pistons in double acting pressure cylinders and each of said cylinders is connected at its ends with a source of pressure medium through a four-way solenoid valve, the closure valve for the discharge passage of the feeder bin being opened by an energizing circuit that is controlled by the high pressure limit of the air pressure switch in the feeder bin, and the closure valve for the filling opening of the feeder bin being opened by the low pressure limit of the air pressure switch.

22. In combination, an air swept pulverizer, a source of operating air under pressure, connected with the pulverizer for the forced delivery of pulverized fuel therefrom to a point of use, a closed supply vessel for raw fuel having an outlet for gravity flow of raw fuel to the pulverizer, a closed feeder bin having a gravity flow outlet to the supply vessel and having a filling opening, an air pressure equalizing line from the source of operating air direct to the feeder bin, closure valves for the filling opening of the feeder bin, and for its outlet, high level control means in the supply bin to close the latter valve, and means operable by the closing of said valve to close the air pressure equalizing line and connect the bin with atmospheric pressure, means in the feeder bin operable by such reduction in air pressure to open the valve of the filling opening of the feeder bin, high level means in the feeder bin to move its closure valve to closed position, and means operable by such closing movement to open the outlet valve to the supply vessel.

23. A combination as recited in claim 22 including a normally inactive means for feeding raw fuel to the filling opening of the feeder bin, means operable incident to the opening of the closure valve for the filling opening of the bin to activate the feeding means and operable incident to the closure of said valve to deactivate the said fuel feeding means.

24. In combination with material-using apparatus operating under positive fluid pressure, a charging system for supplying material to said apparatus without loss of said apparatus pressure comprising an inlet and an outlet chamber connected in series, means for intermittently charging said inlet chamber at atmospheric pressure, means for intermittently charging said outlet chamber from said inlet chamber at a pressure higher than atmospheric pressure, means for discharging material from said outlet chamber into said material-using apparatus at said higher pressure, apparatus in an upper portion of at least one of said chambers operable in response to the level of material therein, and means including said level responsive apparatus for controlling the sequence of said intermittent charging operations.

DANIEL V. SHERBAN.

REFERENCES CITED

The following references are of record in the file of this patent:

UNITED STATES PATENTS

| Number | Name | Date |
|---|---|---|
| 960,857 | Eggert | Jan. 7, 1910 |
| 1,439,957 | Garred | Dec. 26, 1922 |
| 1,757,634 | Jacques | May 6, 1930 |
| 1,846,826 | Anderson et al. | Feb. 23, 1932 |
| 1,882,056 | Bailey | Oct. 11, 1932 |
| 1,883,218 | Wohlenberg | Oct. 18, 1932 |
| 1,894,020 | Chance | Jan. 10, 1933 |
| 1,897,750 | Brassert | Feb. 14, 1933 |
| 1,943,589 | Domina | Jan. 16, 1934 |
| 2,012,934 | Hardgrove | Aug. 27, 1935 |
| 2,073,553 | Dienst | Mar. 9, 1937 |
| 2,100,848 | Hardgrove | Nov. 30, 1937 |
| 2,103,453 | Graemiger | Dec. 28, 1937 |
| 2,159,629 | Hardgrove et al. | May 23, 1939 |
| 2,222,030 | Hague | Nov. 19, 1940 |
| 2,226,923 | Cross | Dec. 31, 1940 |
| 2,338,606 | Voorhees | Jan. 4, 1944 |
| 2,375,057 | Wiegand | May 1, 1945 |
| 2,387,548 | Wiegand | Oct. 23, 1945 |

FOREIGN PATENTS

| Number | Country | Date |
|---|---|---|
| 579,804 | France | Oct. 24, 1924 |